United States Patent
Miyake et al.

(10) Patent No.: US 11,636,876 B2
(45) Date of Patent: Apr. 25, 2023

(54) MAGNETIC DISK DEVICE

(71) Applicants: Kabushiki Kaisha Toshiba, Tokyo (JP); Toshiba Electronic Devices & Storage Corporation, Tokyo (JP)

(72) Inventors: Koji Miyake, Kanagawa (JP); Takuya Ogawa, Tokyo (JP); Wataru Tsukahara, Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 17/651,052

(22) Filed: Feb. 14, 2022

(65) Prior Publication Data
US 2022/0343948 A1    Oct. 27, 2022

(30) Foreign Application Priority Data

Apr. 23, 2021   (JP) .............................. JP2021-073439

(51) Int. Cl.
G11B 19/26    (2006.01)
G11B 5/55    (2006.01)

(52) U.S. Cl.
CPC ............ *G11B 19/26* (2013.01); *G11B 5/5547* (2013.01)

(58) Field of Classification Search
None
See application file for complete search history.

(56) References Cited

U.S. PATENT DOCUMENTS

| | | | |
|---|---|---|---|
| 5,699,210 A * | 12/1997 | Thompson | G11B 17/041 360/99.06 |
| 6,243,222 B1 * | 6/2001 | Boutaghou | G11B 5/54 |
| 6,292,333 B1 * | 9/2001 | Blumentritt | G11B 5/54 |
| 6,320,717 B1 * | 11/2001 | Feng | G11B 21/22 |
| 6,594,102 B1 * | 7/2003 | Kanda | G11B 5/54 |
| 6,628,475 B2 * | 9/2003 | Nakamoto | G11B 5/54 |
| 6,731,579 B2 * | 5/2004 | Ishimoto | G11B 7/1387 369/53.37 |
| 7,085,104 B1 * | 8/2006 | Hadian | G11B 5/54 |
| 8,743,502 B1 * | 6/2014 | Bonke | G11B 19/28 360/73.03 |
| 2003/0016472 A1 * | 1/2003 | Hawwa | G11B 21/22 |
| 2005/0030664 A1 * | 2/2005 | Shin | G11B 33/146 360/97.16 |

(Continued)

FOREIGN PATENT DOCUMENTS

| | | |
|---|---|---|
| JP | H2-168466 A | 6/1990 |
| JP | H2-92865 U | 7/1990 |
| JP | H8-221880 A | 8/1996 |

*Primary Examiner* — Peter Vincent Agustin
(74) *Attorney, Agent, or Firm* — Knobbe, Martens, Olson & Bear, LLP

(57) ABSTRACT

According to one embodiment, a magnetic disk device includes a magnetic disk, a spindle motor, a magnetic head, a ramp load mechanism, a filter, and a control section. The control section rotates the spindle motor at a second rotating speed for a given period of time at startup of the device, and then loads the magnetic head from the ramp load mechanism to a prescribed position on the magnetic disk. The second rotating speed is higher than a first rotating speed at which the spindle motor is rotated at the magnetic head reads/writes data from/to the magnetic disk.

6 Claims, 4 Drawing Sheets

(56) References Cited

U.S. PATENT DOCUMENTS

| | | | | |
|---|---|---|---|---|
| 2005/0041334 A1* | 2/2005 | Kim | ............... | G11B 33/146 |
| | | | | 360/245.9 |
| 2005/0195523 A1* | 9/2005 | Abe | ............... | B03C 3/155 |
| | | | | 360/97.18 |
| 2005/0219739 A1* | 10/2005 | Alt | ............... | G11B 21/22 |
| 2006/0082919 A1* | 4/2006 | Abe | ............... | G11B 21/12 |
| 2006/0198272 A1* | 9/2006 | McMaster | ............... | G11B 23/0308 |
| 2006/0291086 A1* | 12/2006 | Church | ............... | G11B 5/54 |
| 2008/0068746 A1* | 3/2008 | Kaneko | ............... | G11B 33/148 |
| 2016/0267928 A1* | 9/2016 | Kuwajima | ............... | G11B 5/484 |
| 2022/0343948 A1* | 10/2022 | Miyake | ............... | G11B 5/5547 |

\* cited by examiner

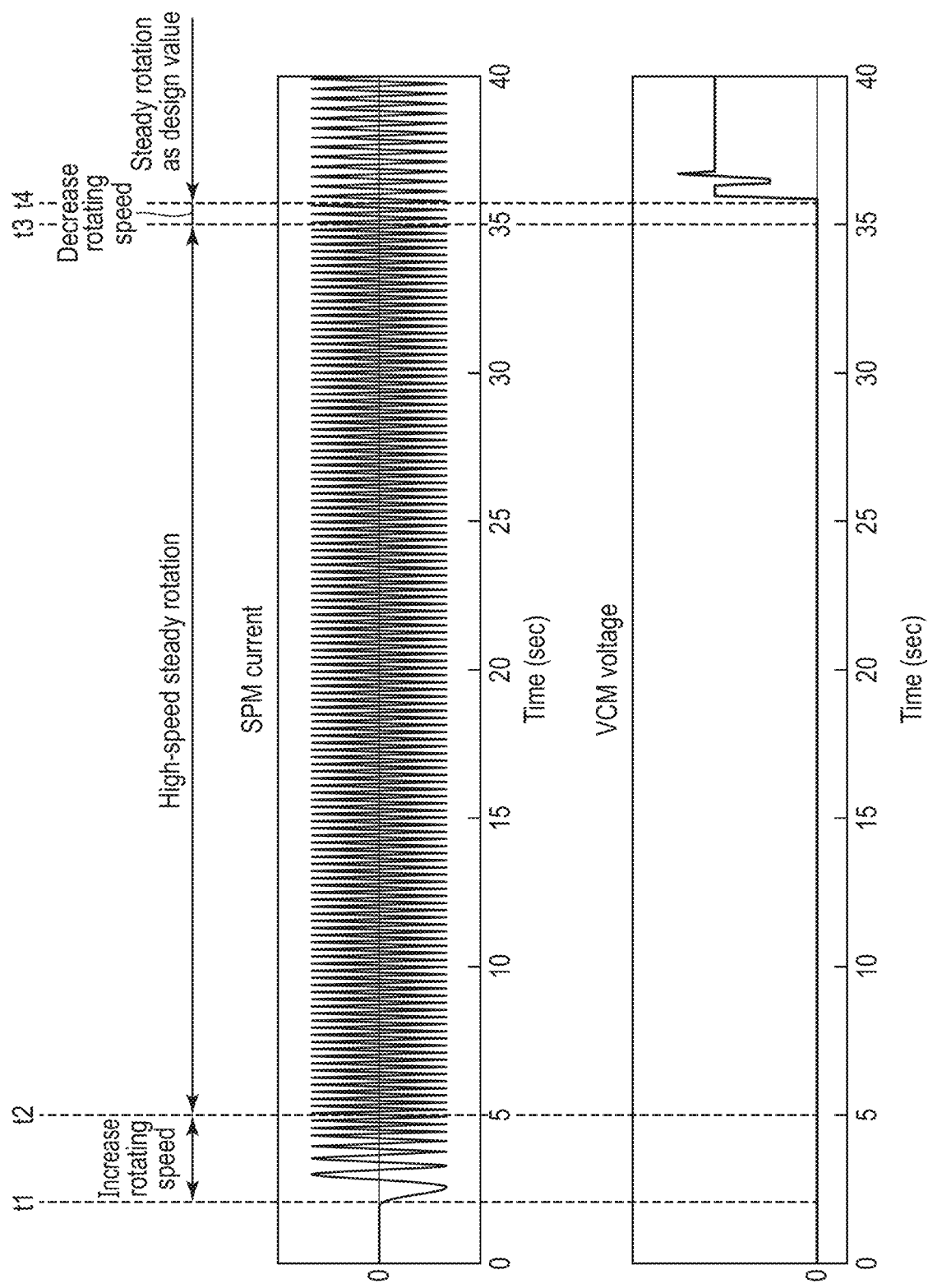
F I G. 4

MAGNETIC DISK DEVICE

CROSS-REFERENCE TO RELATED APPLICATIONS

This application is based upon and claims the benefit of priority from Japanese Patent Application No. 2021-073439, filed Apr. 23, 2021, the entire contents of which are incorporated herein by reference.

FIELD

Embodiments described herein relate generally to a magnetic disk device.

BACKGROUND

A technique related to a magnetic disk device is known, the technique providing the magnetic disk device with a function of setting the rotating speed of a spindle motor higher than a normal rotating speed at startup and reducing the high rotating speed back to the normal rotation speed after the elapse of a given period of time.

Particles produced by components in the magnetic disk device have been a major cause of failures. In general, improving a magnetic layer for the better areal density capability of a magnetic disk and increasing the resistance of the magnetic layer against disk scratches caused by particles caught between a magnetic head and a magnetic disk are contradictory efforts running counter to each other. It is found, from the viewpoint of component costs, that suppressing generation of dust from components achieves limited effects, and, consequently, design work that balances areal density capability and component cleanliness has become difficult from generation to generation. An optimized air bearing surface (ABS) design is effective in reducing the rate of occurrence of particle catching. The ABS, however, is effective only when the magnetic head stays in the air above the magnetic disk.

There is a case where a recirculation filter is incorporated in the magnetic disk device as one of particle reduction measures. Causing the recirculation filter to work properly, however, requires that airflows hit the recirculation filter. To clean an gas inside the magnetic disk device, therefore, a user has to actuate a spindle motor to generate an airflow and then wait for a given time until the cleanliness of the gas inside the magnetic disk is improved. Because the recirculation filter works in this manner, the inside of the magnetic disk device is kept normal when the magnetic disk device is in operation. At the start of the magnetic disk device, however, the cleanliness of the gas inside the magnetic disk device is low, raising a high risk of particle catching.

One feasible approach to deal with this problem is to wait for a sufficient time, from the start of the magnetic disk device until the gas in the magnetic disk device becoming clean, and then load the magnetic head to a prescribed position on the magnetic disk. This approach, however, is difficult to put into practice because of restrictions on a startup time required for the magnetic disk device.

Further, in the above-described technique related to the magnetic disk device, timing of loading the magnetic head is not examined at all. Timing of loading the magnetic head, therefore, varies, which raises a possibility that depending on whether the timing is proper or not, the magnetic head may be loaded before the cleanliness of the gas in the magnetic disk device is improved. In such a case, the cleanliness of the gas in the magnetic disk device is low, and the risk of particle catching increases.

BRIEF DESCRIPTION OF THE DRAWINGS

FIG. 4 shows timing charts for explaining an example of effects according to the embodiment.

DETAILED DESCRIPTION

Figure 1:
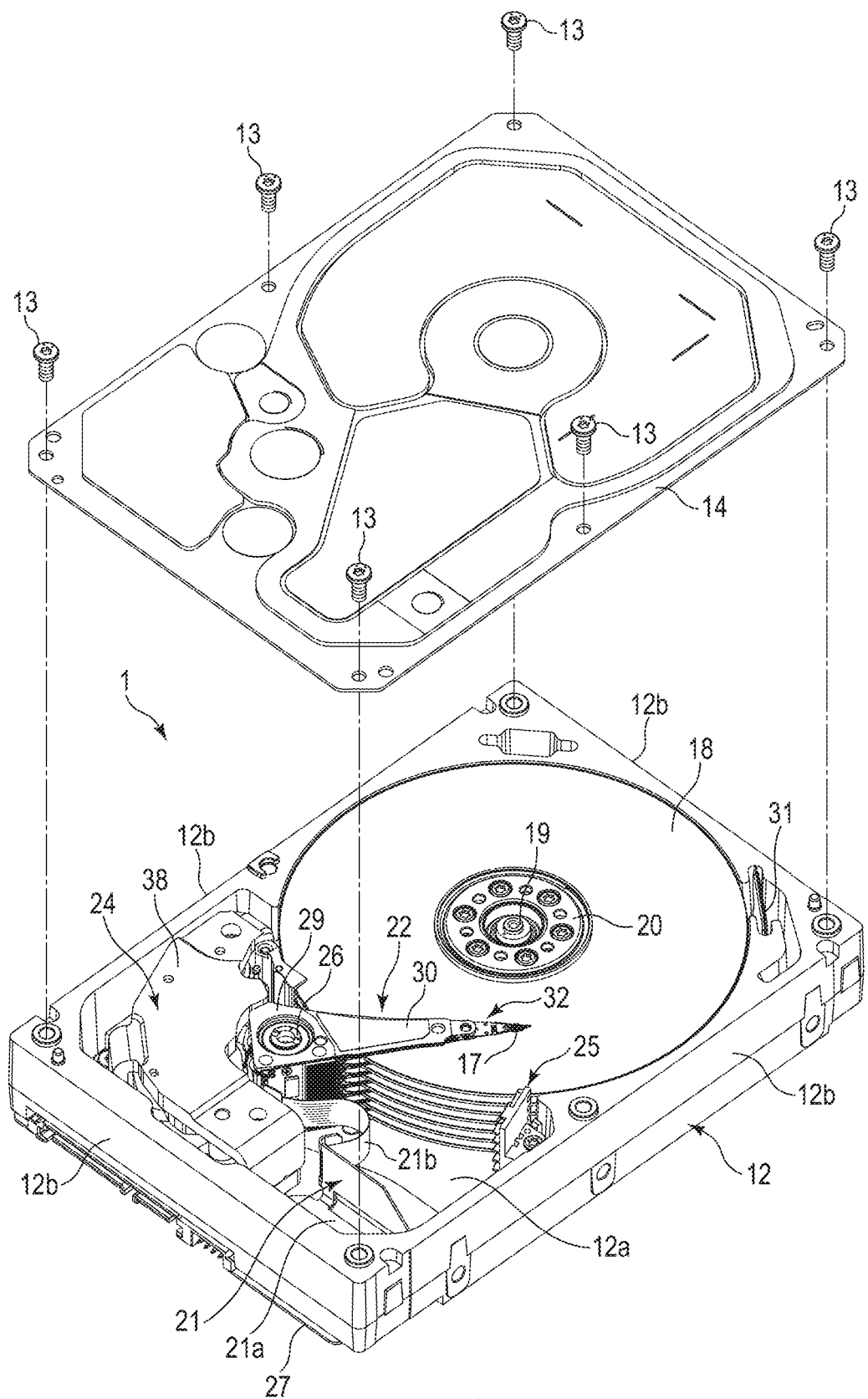
FIG. 1 is an exploded perspective view of an example of a magnetic disk device with its top cover removed, according to an embodiment.

In general, according to one embodiment, a magnetic disk device includes a magnetic disk; a spindle motor which rotates the magnetic disk; a magnetic head which reads/writes data from/to the magnetic disk; a ramp load mechanism which loads the magnetic head to a prescribed position on the magnetic disk; a filter which an airflow generated by rotation of the magnetic disk passes when the magnetic disk is rotated by the spindle motor; and a control section which rotates the spindle motor at a second rotating speed for a given period of time at startup of the device, and then loads the magnetic head from the ramp load mechanism to a prescribed position on the magnetic disk. The second rotating speed is higher than a first rotating speed at which the spindle motor is rotated at the magnetic head reads/writes data from/to the magnetic disk.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. Further, in the specification and drawings, corresponding elements are denoted by like reference numerals, and a detailed description thereof may be omitted unless otherwise necessary.

FIG. 1 is an exploded perspective view of an example of a magnetic disk device with its top cover removed. A magnetic disk device 1 includes a housing 10 of a flat and substantially rectangular shape. The housing 10 includes a base 12 of a rectangular box shape with a top opening, and a top cover 14. The base 12 has a bottom wall 12a of a rectangular shape, the bottom wall 12a being counter to the top cover 14 across a gap, and side walls 12b erected along the periphery of the bottom wall 12a. The base 12 is integrally molded out of, for example, aluminum. The top cover 14 is made of, for example, stainless steel, and is formed into a rectangular plate shape. The top cover 14 is screwed onto the side walls 12b of the base 12, using a plurality of screws 13, thus closing the upper opening of the base 12.

The housing 10 houses therein a plurality of magnetic disks 18, which are disk-shaped recording media, and a spindle motor 19 that supports and rotates the magnetic disks 18. The spindle motor 19 is disposed on the bottom wall 12a. Each magnetic disk 18 is, for example, 88.9 mm (3.5 inches) in diameter, and has a magnetic recording layer on its upper surface or lower surface. The magnetic disks 18 are coaxially fitted to a hub (not shown) of the spindle motor 19, and are clamped by a clamp spring 20 to be fixed to the hub. As a result, the magnetic disks 18 are supported such that each magnetic disk 18 is kept parallel with the bottom wall 12a of the base 12. Each magnetic disk 18 is rotated by the spindle motor 19 at a given rotating speed. In this embodiment, for example, seven magnetic disks 18 are arranged in the housing 10, as shown in FIG. 1. The number of magnetic disks 18, however, is not limited to 7.

The housing 10 houses therein a plurality of magnetic heads 17 that record/read information onto/from the magnetic disks 18, and an actuator assembly 22 that supports these magnetic heads 17 in such a way as to allow the magnetic heads 17 to move freely relative to the magnetic disks 18. The housing 10 further houses therein a voice coil motor (VCM) 24 that rotates and positions the actuator assembly 22, a ramp load mechanism 25 that when a magnetic head 17 moves to the outermost periphery of a magnetic disk 18, holds the magnetic head 17 at an unload position separated away from the magnetic disk 18, and a board unit (FPC unit) 21 carrying electronic components, such as a conversion connector.

A printed circuit board 27 is screwed to the outer surface of the bottom wall 12a of the base 12. The printed circuit board 27 controls the operation of the spindle motor 19, and controls also the operation of the VCM 24 and the magnetic head 17 via the board unit 21.

The actuator assembly 22 includes an actuator block 29, a plurality of arms 30, e.g., 8 arms 30 extending from the actuator block 29 in the same direction, and a plurality of head gimbal assemblies (HGA) 32 fitted respectively to extension ends of the arms 30. The actuator block 29 is rotatably supported by a support shaft (pivot) 26 erected on the bottom wall 12a, via a unit bearing. Each HGA 32 has a suspension (load beam) extending from the arm 30, a flexure, i.e., wiring member (not shown) disposed on the load beam and the arm 30, and a magnetic head 17 mounted on a gimbal portion of the flexure.

The actuator assembly 22 further includes a support frame (not shown) extending from the actuator block 29 in the direction opposite to the arm 30, and a voice coil fitted to the support frame. The voice coil lies between a pair of yokes 38 disposed on the bottom wall 12a, and, together with the yokes 38 and a magnet fixed to one of them, makes up the VCM 24. In stand-by mode, the actuator assembly 22 is at an unload position of the ramp load mechanism 25. In normal mode (data reading/writing mode other than the stand-by mode), the actuator assembly 22 is, for example, at a prescribed position on the magnetic disk 18, as shown in FIG. 1. In this manner, the actuator assembly 22 stays at the unload position outside the magnetic disk 18 in the standby mode, and moves to the prescribed position on the magnetic disk 18 in the data reading/writing mode.

The FPC unit 21 has a main body 21a formed of a flexible printed circuit board, and this main body 21a is fixed to the bottom wall 12a of the base 12. Electronic components, such as a conversion connector, are mounted on the main body 21a. The conversion connector penetrates the bottom wall 12a to connect to the printed circuit board 27. The FPC unit 21 has a relay flexible printed circuit board (hereinafter, "relay FPC") 21b extending from the main body 21a. An extension end of the relay FPC 21b is fitted to a side surface (installation surface) of the actuator block 29. The extension end of the relay FPC 21b is electrically connected to the magnetic head 17 via the above flexure.

Inside the housing 10, a recirculation filter (filter) 31 is disposed near the side wall 12b and is located outside the magnetic disk 18. The recirculation filter 31 is positioned such that an airflow generated by the rotation of the magnetic disk 18 caused by a moving part in operation, such as the spindle motor 19, flows into the recirculation filter 31. This allows the recirculation filter 31 to gather particles (dust) present over the magnetic disk 18.

The dust-gathering capability of the recirculation filter 31 will then be described.

Theories on the dust-gathering capability of the recirculation filter have already been established. A time $T_{10}$ (reduction-to-$\frac{1}{10}$ period) required for reducing the number of particles in the gas to $\frac{1}{10}$ is given by the following equation (1).

$$T_{10} = \frac{V_0}{2.303 Q \eta} \qquad (1)$$

In the equation (1), $V_0$ denotes the internal volume of the magnetic disk device 1, Q denotes the flow rate of a fluid flowing into the recirculation filter 31 per unit time, and p denotes filter dust-gathering efficiency. It is thus understood that improving (shortening) the reduction-to-$\frac{1}{10}$ period $T_{10}$ requires increasing the flow rate Q or enhancing the filter dust-gathering efficiency p. The flow rate Q is proportional to a pressure difference $\Delta p$ between the upstream side and the downstream side of the recirculation filter 31, and the pressure difference $\Delta p$ is given by the following equation (2).

$$\Delta p = \lambda \tfrac{1}{2} \rho U^2 \qquad (2)$$

In the equation (2), A denotes a coefficient for converting dynamic pressure into static pressure, p denotes the density of the fluid, and U denotes the peripheral speed of the outer edge of the magnetic disk 18. Thus, in the case of a magnetic disk device whose rotating speed as a design value is 7,200 revolutions per minute (hereinafter, "7200 rpm" (round per minute)), increasing the rotating speed of the spindle motor 19 to 10000 rpm, to 12000 rpm, and to 15000 rpm results in the decrease of the reduction-to-$\frac{1}{10}$ period $T_{10}$ by 48%, by 64%, and by 77%.

According to this embodiment, while the startup of the magnetic disk device 1, the spindle motor 19 is rotated at a rotating speed higher than the design value. For example, in the case of the magnetic disk device 1 whose design value, i.e., rotating speed is 7200 rpm, the magnetic disk 18 is rotated at about 10000 rpm for a given time and then its rotating speed is reduced to the design value of 7200 rpm, after which the magnetic head 17 is loaded onto the magnetic disk 18. When a timespan for keeping the magnetic disk in a state of steady high-speed rotation is defined as a high-speed steady rotation time, it is desirable that the high-speed steady rotation time be equal to the reduction-to-$\frac{1}{10}$ period $T_{10}$. Specifically, however, the high-speed steady rotation time may be set within a range of 2 seconds to 60 seconds. 2 seconds, which is the shortest high-speed steady rotation time, is adopted in a case where reducing particles to the half is admitted as an acceptable effect without waiting for achievement of particle reduction to $\frac{1}{10}$. In other words, it is a case where the magnetic head 17 is loaded when the particle density is reduced from the initial density to 50%. In this case, the reduction-to-half period of a conventional magnetic disk device ranges from 3 seconds to 4 seconds, and because a margin to cover a change in the reduction-to-half period resulting from a revised recirculation filter design or the like is needed, the shortest high-speed steady rotation time is set to 2 seconds. 60 seconds, on the other hand, is the longest high-speed steady rotation time, in which case the reduction-to-1/10 period $T_{10}$ of the conventional magnetic disk device ranges from 35 seconds to 45 seconds. In this case, a margin to cover a change in the reduction-to-1/10 period $T_{10}$ resulting from a revised recirculation filter design or the like is needed, and therefore the longest high-speed steady rotation time is set to 60 seconds.

Figure 2:
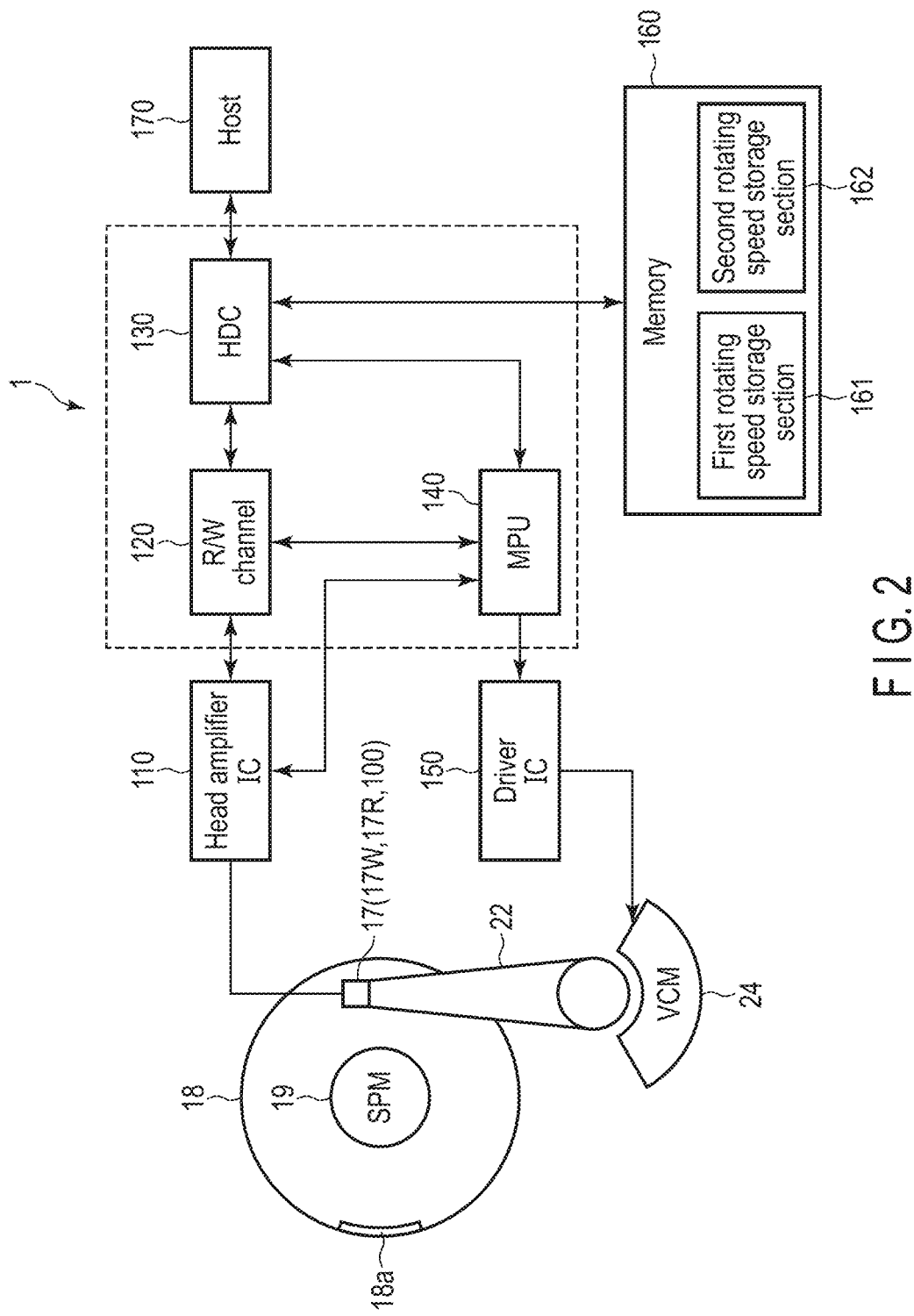
FIG. 2 is a block diagram of an example of a control configuration of the magnetic disk device according to the embodiment.

A control configuration of the magnetic disk device 1 will then be described. FIG. 2 is a block diagram of an example of the control configuration of the magnetic disk device.

As shown in FIG. 2, the magnetic disk device 1, as described above, includes the magnetic disks 18, the spindle motor (SPM) 19, the actuator assembly 22, the voice coil motor (VCM) 24, and the magnetic heads 17.

The magnetic disk device 1 further includes a head amplifier IC 110, an R/W channel 120, a hard disk controller (HDC) 130, a microprocessor (MPU) 140, a driver IC 150, and a memory 160. The magnetic disk device 1 can be connected to a host computer (host) 170. The R/W channel 120, HDC 130, and MPU 140 may be incorporated in a one-chip integrated circuit.

Each magnetic head 17 includes a write magnetic head (recording magnetic head: writer) 17W, a read magnetic head (reproduction magnetic head: reader) 17R, and a spin-torque-oscillator (STO) 100, which is a high-frequency oscillator.

The spindle motor 19 is driven by a drive current (or drive voltage) supplied from the driver IC 150. To/from the magnetic disk 18, a data pattern is recorded/read by the magnetic head 17.

The voice coil is actuated by the voice coil motor 24, and the actuator assembly 22 is rotated from the unload position of the ramp load mechanism 25. This moves the magnetic head 17 onto an intended track of the magnetic disk 18, thus setting the magnetic head 17 at the prescribed position on the magnetic disk 18. The voice coil motor 24 is driven by a drive current (or drive voltage) supplied from the driver IC 150.

The head amplifier IC 11 includes circuits related to driving the STO 100 and detecting its oscillation characteristics. The head amplifier IC 110 drives the STO 100 and detects a drive signal therefor. In addition, the head amplifier IC 110 supplies a write signal (write current) corresponding to write data supplied from the R/W channel 120, to the write magnetic head 17W. Further, the head amplifier IC 110 amplifies a read signal outputted from the read magnetic head 17R and transmits the amplified read signal to the R/W channel 120.

The R/W channel 120 is a signal processing circuit that processes signals related to read/write operations. The R/W channel 120 includes a read channel that carries out signal processing on read data and a write channel that carries out signal processing on write data. The read channel converts a read signal into digital data, and demodulates the digital data to extract read data. The write channel encodes write data transferred from the HDC 130, and transfers the encoded write data to the head amplifier IC 110.

The HDC 130 controls data writing to the magnetic disk 18 and data reading from the magnetic disk 18, through the magnetic head 17, head amplifier IC 110, R/W channel 120, and MPU 140. The HDC 130 makes up an interface between the magnetic disk device 1 and the host 170, and executes control over transfer of read data and write data. In other words, the HDC 130 functions as a host interface controller that receives a signal transferred from the host 170 and that transfers a signal to the host 170. When transferring a signal to the host 170, the HDC 130, which follows the MPU 140, carries out an error correction process on read signal data that is read by the magnetic head 17 and is demodulated. In addition, the HDC 130 receives a command (write command, read command, or the like) transferred from the host 170, and transmits the received command to the MPU 140.

The MPU 140 is a main controller (control section) of the magnetic disk device 1, executing control of read/write operations and servo control required for positioning the magnetic head 17. The MPU 140 controls also a startup process on the magnetic disk device 1. The details of the startup process will be described later with reference to FIG. 3.

Under control by the MPU 140, the driver IC 150 controls driving of the spindle motor 19 and the voice coil motor 24. Driving the voice coil motor 24 sets the magnetic head 17 on a target track of the magnetic disk 18.

The memory 160 includes a volatile memory and a non-volatile memory. For example, the memory 160 includes a buffer memory composed of a DRAM, and a flash memory. The memory 160 stores programs and parameters needed for processes the MPU 140 executes. In this embodiment, the memory 160 includes a first rotating speed storage section 161 and a second rotating speed storage section 162. The first rotating speed storage section 161 stores a first rotating speed (7200 rpm according to this embodiment), which is a design value. This design value is the rotating speed at which the spindle motor 19, in other words, the magnetic disk 18 is rotated when the magnetic head 17 reads/writes data from/to the magnetic disk 18. The second rotating speed storage section 162 stores a second rotating speed (10000 rpm according to this embodiment), which is higher than the first rotating speed. The first rotating speed storage section 161 and the second rotating speed storage section 162 are stored in the non-volatile memory making up the memory 160. In this embodiment, a case where the first rotating speed is 7200 rpm and the second rotating speed is 10000 rpm will be described. However, the first and second rotating speeds are not limited to 7200 rpm and 10000 rpm. For example, when the first rotating speed is any one of 5400 rpm, 7200 rpm, 10000 rpm, 12000 rpm, and 15000 rpm, the second rotating speed set to a rotating speed at least higher than any one of these first rotation speeds is acceptable.

Figure 3:
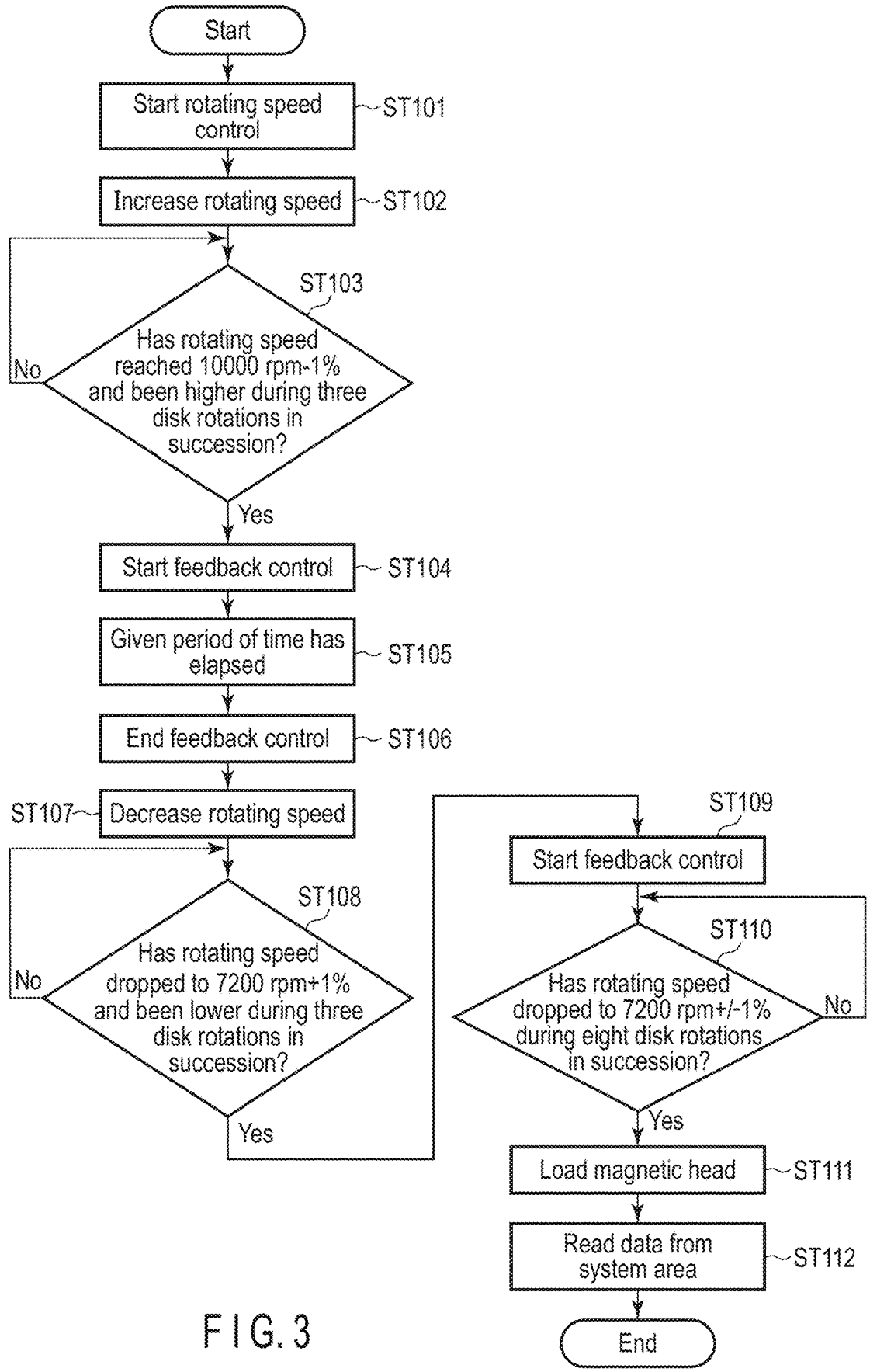
FIG. 3 is a flowchart showing an example of a startup process according to the embodiment.

A process of starting up the magnetic disk device 1 will then be described. FIG. 3 is a flowchart of an example of a startup process executed by the MPU 140. This process is carried out as a result of, for example, the MPU 140 reading and executing a program stored in the memory 160.

As shown in FIG. 3, when a power supply (not shown) is turned on, the MPU 140 starts rotating speed control (ST101), and increases the rotating speed of the magnetic disk 18 (ST102). In this embodiment, the MPU 140 increases the rotating speed of the magnetic disk 18, with a goal of bringing the rotating speed of the spindle motor 19 to the second rotating speed (10000 rpm according to the present embodiment) stored in the second rotating speed storage section 162.

Subsequently, the MPU 140 determines whether the rotating speed of the magnetic disk 18 has reached (10000 rpm−1%) and been higher during three disk rotations in succession (ST103). When determining that the rotating speed has neither reached (10000 rpm−1%) nor been higher during three disk rotations in succession (ST103: NO), the MPU 140 repeats the process of step ST103. When determining that the rotating speed has reached (10000 rpm−1%) and been higher during three disk rotations in succession (ST103: YES), the MPU 140 proceeds to step ST104. In this embodiment, whether the rotating speed of the magnetic disk 18 has reached (10000 rpm−1%) and been higher during three disk rotations is determined at step ST103. The process of step ST103, however, is not limited to this.

Subsequently, the MPU 140 starts feedback control (ST104), and when the high-speed steady rotation time is over (ST105), ends the feedback control (ST106). Through this process, the rotating speed of the magnetic disk 18 is kept at 10000 rpm (second rotation speed) to put the magnetic disk 18 in a state of steady rotation during the high-speed steady rotation time. In this manner, during the high-speed steady rotation time, the magnetic disk 18 is rotated at a speed higher than the first rotation speed, i.e., the design value.

Subsequently, the MPU 140 decreases the rotating speed of the magnetic disk 18 (ST107). In this embodiment, the MPU 140 decreases the rotating speed of the magnetic disk 18, with a goal of bringing the rotating speed of the spindle motor 19 to the first rotating speed (7200 rpm) stored in the first rotating speed storage section 161.

The MPU 140 then determines whether the rotating speed of the magnetic disk 18 has dropped to (7200 rpm+1%) and been lower during three disk rotations in succession (ST108). When determining that the rotating speed has neither dropped to (7200 rpm+1%) nor lower three times in succession (ST108: NO), the MPU 140 repeats the process of step ST108. When determining that the rotating speed has dropped to (7200 rpm+1%) and been lower during three disk rotations in succession (ST108: YES), the MPU 140 proceeds to step ST109. In this embodiment, whether the rotating speed of the magnetic disk 18 has dropped to (7200 rpm+1%) and been lower during three disk rotations in succession is determined at step ST108. The process of step ST108, however, is not limited to this.

Subsequently, the MPU 140 starts feedback control (ST109).

The MPU 140 then determines whether the rotating speed of the magnetic disk 18 has fallen into a range of (7200 rpm+/−1%) during eight disk rotations in succession (ST110). When determining that the rotating speed has not fallen into the range of (7200 rpm+/−1%) during eight disk rotations in succession (ST110: NO), the MPU 140 repeats the process of step ST110. When determining that the rotating speed has fallen into the range of (7200 rpm+/−1%) during eight disk rotations in succession (ST110: YES), the MPU 140 proceeds to step ST111. Hence the rotation speed of the magnetic disk 18 is kept steadily at 7200 rpm. In this embodiment, whether the rotating speed has fallen into the range of (7200 rpm+/−1%) eight times in succession is determined at step ST111. The process of step ST111, however, is not limited to this.

Subsequently, the MPU 140 loads the magnetic head 17 onto the magnetic disk (ST111). More specifically, the MPU 140 actuates the actuator assembly 22 located at the unload position of the ramp load mechanism 25. As a result, the magnetic head 17 is set at the prescribed position on the magnetic disk 18. The prescribed position, according to this embodiment, is a system area 18a of the magnetic disk 18. Subsequently, the MPU 140 reads data out of the system area 18a (ST112). This completes the startup process on the magnetic disk device 1.

Operations of the spindle motor 19 and the voice coil motor 24 at the startup will then be described. FIG. 4 shows timing charts for explaining an example of effects according to this embodiment. An upper side chart of FIG. 4 depicts an example of a relationship between time and a current applied to the spindle motor 19, and a lower side chart of FIG. 4 depicts a relationship between time and a voltage applied to the voice coil motor 24.

As shown in the upper side chart of FIG. 4, a current is first applied to the spindle motor 19 in a timespan between time t1 and time t2 so as to increase the rotating speed of the magnetic disk 18 (the above processes of ST101 to ST103). As a result, the magnetic disk increases its rotating speed up to the second rotating speed.

Subsequently, a current is applied to the spindle motor 19 in a timespan between time t2 and time t3 so as to maintain the high rotating speed of the magnetic disk 18 (the above processes of ST104 to ST106). The magnetic disk 18 thus keeps rotating at a high speed, i.e., the second rotation speed, which sends an airflow into the recirculation filter 31, allowing it to gather particles. This timespan between time t2 and time t3, according to this embodiment, is 30 seconds.

Subsequently, a current is applied to the spindle motor 19 in a timespan between time t3 and time t4 so as to decrease the rotating speed of the magnetic disk 18 (the above processes of ST107 to ST108). As a result, the rotation speed of the magnetic disk 18 drops from the second rotation speed to the first rotation speed. Time t4 onward, feedback control is executed, by which the magnetic disk 18 is rotated in such a way as to maintain the first rotating speed (the above processes of ST109 and ST110).

Meanwhile, no voltage is applied to the voice coil motor 24 before time t4 arrives, the voice coil motor 24 actuating the actuator assembly 22. In other words, following the rotation of the magnetic disk 18 at a high speed, i.e., the second rotating speed, a voltage is applied to the voice coil motor 24 at time t4 at which the magnetic disk 18 starts rotating steadily at the first rotating speed (the above step ST111). In this manner, as a result of an airflow entering the recirculation filter 31, the airflow being generated by the high-speed rotation of the magnetic disk 18, during the timespan between time t2 and time t3 (30 seconds according to this embodiment), particles that may be present over the magnetic disk 18 are gathered by the recirculation filter 31. Afterward, the actuator assembly 22 is moved from the unload position of the ramp load mechanism 25 to the system area 18a of the magnetic disk 18.

According to the magnetic disk device 1 of this embodiment, failures caused by particle catching while the startup can be reduced without extending the startup time. More specifically, the magnetic disk device 1 rotates the magnetic disk 18 at the second rotating speed faster than the first rotating speed, i.e., the design value for a given period of time, thereby shortening the reduction-to-1/10 period $T_{1/10}$, which is the time required for reducing particles in the magnetic disk device 1 to the half. The magnetic disk device 1 is thus able to gather particles sufficiently by the recirculation filter 31 without extending the start-up time. Following particle gathering, the magnetic disk device 1 loads the magnetic head 17 onto the magnetic disk 18. This process improves the reliability of the magnetic disk device 1.

The technique of this embodiment is effective as a technique for controlling the startup process of the magnetic disk device, by which, for example, when the magnetic head 17 is loaded on the magnetic disk 18 at the startup of the magnetic disk device, the head surface of the magnetic head 17 is temporarily brought into contact with the disk surface of the magnetic disk 18, and, according to detection of contact between both surfaces, the distance between the disk surface and the head surface is controlled.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
    a magnetic disk;
    a spindle motor which rotates the magnetic disk;
    a magnetic head which reads/writes data from/to the magnetic disk;
    a ramp load mechanism which loads the magnetic head to a prescribed position on the magnetic disk;
    a filter which an airflow generated by rotation of the magnetic disk passes when the magnetic disk is rotated by the spindle motor; and
    a control section which rotates the spindle motor at a second rotating speed for a given period of time at startup of the device, and then loads the magnetic head from the ramp load mechanism to a prescribed position on the magnetic disk,
    wherein the second rotating speed is higher than a first rotating speed at which the spindle motor is rotated at the magnetic head reads/writes data from/to the magnetic disk, and
    wherein the control section carries out feedback control to cause the magnetic disk to rotate at the first rotating speed after rotating the spindle motor for a given period of time, and loads the magnetic head from the ramp load mechanism to the prescribed position on the magnetic disk after a rotating speed of the magnetic disk comes to steadily remain the first rotating speed due to the feedback control.

2. The device according to claim 1, wherein
the control section keeps a rotating speed of the magnetic disk at the second rotating speed by feedback control for the given period of time.

3. The device according to claim 1, wherein
the given period of time is equivalent to a reduction-to-$\frac{1}{10}$ period that is required for the filter to reduce an amount of dust present in a gas in a housing of the magnetic disk to $\frac{1}{10}$.

4. The device according to claim 1, wherein
the first rotating speed is any one of 5400 rpm, 7200 rpm, 10000 rpm, 12000 rpm, and 15000 rpm.

5. The device according to claim 1, further comprising:
a memory which stores the first rotating speed and the second rotating speed.

6. The device according to claim 1, wherein
the magnetic disk includes a system area for managing data written to the magnetic disk, and wherein
the prescribed position is a position at which the magnetic head reads data from the system area.

* * * * *